Patented Aug. 18, 1953

2,649,388

UNITED STATES PATENT OFFICE 2,649,388

MANUFACTURE OF SILICA FILLED MATERIALS

John Haines Wills, Chester, and James Frederic Hazel, Havertown, Pa., assignors to Philadelphia Quartz Company, Philadelphia, Pa., a corporation of Pennsylvania No Drawing. Application August 24, 1948,
Serial No. 45,974

22 Claims. (Cl. 117—103)

This invention relates to manufacture of silica-filled materials; and it comprises a process wherein an aqueous silica sol which can be frozen irreversibly is subjected to freezing temperatures when in admixture with dispersed particles of at least one finely-divided substantially-inert material for a time sufficient to produce freezing, the frozen mass is then thawed and the resulting $SiO_2$-filled material is recovered. The invention also includes the $SiO_2$-filled product produced by the described process; said product comprising particles of said inert material having finely-divided particles of amorphous $SiO_2$ admixed therewith and cemented thereto, the bulk of the $SiO_2$ particles under the petrographic microscope appearing to be in the form of thin, soft, transparent, laminated flakes which are sometimes of rectangular shape having clearly defined, straight, tapering edges and varying in size from about 1 to 15 microns in maximum dimension. In our preferred embodiment these flakes under the electron microscope appear as aggregates of particles having dimensions of from about 10 to 50 Angstrom units. The flakes of the preferred embodiment have a refractive index of from about 1.43 to 1.47 and are soft and free from sharp edges and rough surfaces; all as more fully set forth and as claimed.

In the chemical arts the use of diluents, fillers, carriers and/or extenders is rather common. One difficulty involved in the use of these materials is that the extended product if in finely-divided form tends to segregate and thereby become non-uniform. Silica has been used as an extender or filler rather frequently and it is, of course, one of the cheapest of the materials to be so used. It has long been a desideratum in the art to find some method of producing silica in admixture with other materials to be extended in which the tendency to segregate has been eliminated or reduced.

We have found a very simple and inexpensive method of simultaneously producing silica in finely divided amorphous form and admixing it with particles of various inert materials in such manner that it is uniformly precipitated on and cemented to the particles of the inert material, whereby segregation is eliminated. This method involves the formation of silica sol which freezes irreversibly, that is, a sol which when frozen and then thawed forms a precipitate of silica which cannot be redispersed. This sol is frozen in admixture with an inert material in finely divided form which is dispersed or suspended in the sol when frozen. The degree of dispersion of the inert material at the time freezing takes place may vary greatly. For example, the particles of inert material can be of colloidal dimensions or they can be the fibers of a fabric to be impregnated with silica or they can be discrete particles of an inert material. But in all cases we have discovered that when the dispersion or suspension is frozen and then thawed the inert material is uniformly impregnated with extremely fine particles of silica.

Under the petrographic microscope the ultimate $SiO_2$ particles are not visible, since the size of these particles is close to the present limit of resolution of the electron microscope, but flake-like aggregates are visible and these appear to be attached to the particles of inert material. This is apparently due to the fact that the particles of inert material serve as foci for the formation of the silica particles. Part of the structure of the silica enters the pores of the inert material and thus becomes in effect cemented thereto. If the inert material is fibrous the particles of silica occur frequently within the fibrous structure itself. Separation of the silica particles from the inert particles usually cannot be effected even by methods such as centrifuging, differential settling or the like. Segregation under ordinary conditions of handling is thus completely eliminated.

It should be noted that our method not only results in the intimate and uniform mixing of a finely-divided inert material with silica particles but also that the silica particles are produced simultaneously in an extremely finely-divided state. The finest particles are ultra-microscopic in size while the flake-like aggregates in their largest dimension measure only from about 1 to 15 microns in diameter. To produce silica particles in this state of subdivision by ordinary methods, such as grinding, would, of course, be prohibitively expensive. Our method thus represents an improvement in two directions, (1) the mixture obtained is non-segregating and (2) the silica is produced in finely-divided form at low cost.

An additional advantage gained by our invention is that the silica particles produced by our process are free from rough surfaces and sharp edges. The sharp edges and rough surfaces produced by ordinary comminuting techniques tend to decrease resistance to cracking in materials, such as rubber, filled therewith. The silica particles of the present invention also have a higher reactivity than particles produced by usual methods and other properties are changed advantageously for many uses.

Several methods are available for producing silica sols which are subject to irreversible freezing, which sols can be used in the present invention. A suitable method is described in a recent publication by one of us, James F. Hazel in the Journal of Physical and Colloid Chemistry, 51, 415-25 (1947), for example. This method entails passing aqueous alkali metal silicate solutions in contact with an ion exchange resin operating in the hydrogen cycle, a procedure which reduces the pH of the silicate solutions without increasing their electrolyte content. Dialysis and electrolysis of alkali metal silicate solutions also produce silica sols which can be frozen irreversibly. It is likewise possible to obtain silica sols subject to irreversible freezing by the hydrolysis of silicon halides, silicones and silicate esters, for example. Suitable silica sols can also be produced by the peptization of finely divided $SiO_2$. One of the cheapest and most generally applicable methods of preparing suitable silica sols is described in the copending sole application by one of us, James F. Hazel, Serial No. 783,131, filed October 30, 1947. This our preferred method involves reducing the pH of alkali metal silicate solutions to within the range of about 1 to 12.5 or preferably 4.5 to 11.5; said solutions having a centration of $SiO_2$ ranging from about 5 parts per million to the most concentrated sols that can be prepared, i. e. to about 30 per cent by weight, or preferably containing from about 2 to 25 per cent $SiO_2$ and having a ratio of $SiO_2$ to alkali metal oxide available to combine therewith of at least about 5 : 1. In preparing these sols from commercial alkali metal silicate solutions only about 40 per cent of the alkali present needs to be neutralized.

In the process of the present invention an aqueous silica sol of the described characteristics can be thoroughly mixed with an inert water-insoluble material to be impregnated or mixed with $SiO_2$ and then frozen. Alternatively a mixed sol containing $SiO_2$ and the inert material also in colloidal condition can be prepared by any of the suitable methods available and this mixed sol can be frozen and then thawed. The sols are metastable, that is, they tend to gel, and it is important that freezing be completed before any substantial gelation takes place. Upon subsequent thawing it will be found that finely-divided particles of $SiO_2$ are deposited on and cemented to particles of the inert material. The aqueous liquid can be removed from the thawed mass by conventional methods, such as filtering, centrifuging or the like. The inert material may take the form of an inorganic pigment, such as ultramarine blue; or an organic fibrous material, such as cotton, wool or rayon; or it may be a cellulose ester or ether, such as cellulose acetate; or one of the natural or synthetic resins, such as rosin and phenol-formaldehyde or alkyd resins; or an organic colloidal material, such as rubber latex; or an insecticide, such as DDT. Any finely-divided insoluble material which is inert towards the silica sol can be impregnated or filled with $SiO_2$ in the manner indicated. It can be readily understood, therefore, that our process is widely applicable in the production of extended or filled products of all types.

The nature of the silica particles produced in our process depends to some extent upon the rate of freezing employed. For production of the finest and softest particles with the greatest surface area freezing should be completed within a period of less than 10 minutes, after congelation commences, or preferably within one minute or less. If the time required for freezing is over an hour the silica particles are mostly coarse agglomerates with a sandy texture. Slow freezing also tends to cause the precipitation of large particles of gelatinous $SiO_2$. The relative proportions of inert material and $SiO_2$ in the silica sol can be varied widely. Our tests have shown that it is possible to vary the quantity of finely-divided $SiO_2$ in the final product from substantially zero to 95 per cent by weight or over. The practical range is from about 5 to 85 per cent by weight.

Of course it is necessary that the silica sol and the inert materials be thoroughly admixed at the time congelation takes place. If the mixture is frozen in bulk by the application of external chilling to a container, it is necessary that the finely-divided inert material be suspended in some manner in the silica sol during freezing. If the silica sol is relatively concentrated and if the inert material is sufficiently fine it is usually possible to form a suspension of the inert material in the sol which is sufficiently stable to permit freezing before separation occurs. Otherwise it is possible, of course, to agitate the mixture during the freezing step or to employ a drum freezing method wherein the freezing drum is rotated in an agitated mixture of inert material and silica sol. The so-called Flake-ice and Pakice methods are applicable. Rapid freezing can be accomplished conveniently by the addition of solid $CO_2$ (Dry Ice) to the suspension or an immiscible liquid, such as kerosene, can be chilled with Dry Ice and the suspension then poured into the chilled liquid. Rapid freezing is necessary when highly unstable silica sols are frozen for the reason that freezing must be completed before any substantial gelation of the sol occurs. If the sol has precipitated or gelled to any important extent before freezing is completed, coarse, granular and hard $SiO_2$ particles are formed and these particles are not effectively cemented to the inert particles.

A wide range of freezing temperatures is applicable. These may vary from about $-1°$ C. down to at least $-193°$ C., the temperature of liquid air. Thus while the rate of freezing is important, as indicated above, the temperature at which it takes place is not critical.

While our process is usually conducted in such manner that a pre-formed inert material in finely-divided state is admixed with a pre-formed silica sol, it is possible to vary this procedure either by forming the particles of inert material in the sol, by chemical reaction, for example, or by forming the silica sol or a mixed sol after the mixing has taken place or during the mixing. A sol-forming material such as an acid or an acid salt is usually mixed with a silicate solution to produce the silica sol and this sol-forming material can, of course, be mixed with the inert material before adding the latter to the silicate solution or it can be added to a mixture of the inert material and the silicate solution. Or a sol-forming material may be used which reacts with a silicate solution or a component therein to form the required inert material in the mixture at the same time it forms a sol—either a silica sol or a mixed sol. A wide variety of procedures can thus be used for the production of our silica-impregnated products.

Our invention can be explained in greater detail by reference to the following specific examples which represent practical operating embodiments thereof. In each of these examples the mixture of sol and inert material was stable at least over night.

Example 1

A silica sol was prepared by diluting "N" silicate of soda, sold by the Philadelphia Quartz Company, containing 28.7% $SiO_2$ and having a weight per cent ratio of $Na_2O$ to $SiO_2$ of 1 : 3.22, four fold with water and passing it through a bed of organic base exchange resin, operating in the hydrogen cycle, known as "Amberlite IR-100H" and sold by the Resinous Products Company. The treated sol was boiled down until it contained 13% $SiO_2$ at which composition it had a pH of 9.6. Of this sol, 28.5 parts by weight were thoroughly mixed with 28.8 parts of styrene-butadiene (GR-S) latex type 3 (38.12% solids) made by the Naugatuck Chemical Company. The resulting homogeneous solution containing 19.3% rubber solids and 6.5% $SiO_2$ was frozen at $-20°$ C. for ten minutes. On thawing it was found that practically all the rubber and silica had separated and were mutually intermixed in particles in which the separate components could not be distinguished with a high power microscope. This represents a 25% loading of $SiO_2$. The product when washed and dried had excellent elastic properties.

A method of incorporating pure silica into rubber has long been desired and this appears to be a nearly perfect solution to the problem. Other natural and synthetic latices formed from neoprene, a polymer of chloroprene, poly-ester, butyl, poly-sulfide rubber etc. can be treated in similar manner and the proportions may be varied widely to produce the desired loading.

Example 2

A commercial silica sol known as Nalco 306 and containing 6% $SiO_2$ and made by the National Aluminate Company was used. This sol was prepared by ion exchange and had been stored for at least two years and had a pH of about 12. This sol was mixed with the same rubber latex as that used in Example 1 in such proportions that the mixture contained 12 per cent by weight of rubber and 4 per cent of $SiO_2$. This mixture was frozen at $-20°$ C. for a period of 10 minutes and upon thawing a rubber product was recovered containing 1 part $SiO_2$ to 3 parts rubber. After washing and drying the product was extremely rubbery. It could be compounded by milling in conventional fashion to form products having unexcelled physical properties, superior to similar products filled to the same extent with conventional inert fillers.

Example 3

A sol containing about 15% $SiO_2$ was formed by diluting "N" silicate of soda four fold and treating it with sufficient organic exchange resin operating in the hydrogen cycle to form a sol with a pH of about 10.7. This sol, containing about 10% $SiO_2$, was concentrated by evaporation to about 15% $SiO_2$. (Such sols may be evaporated up to concentrations of about 30% or even more.)

Seven parts of a natural latex containing 60% of rubber solids was mixed with 500 parts of the described sol. The mixture was frozen, thawed and filtered and solids dried at 50° C. The $SiO_2$ formed about 95% of the solids and was found upon microscopic investigation to be intermingled with and deposited upon the short rubber fibers as irregular platelets.

A silica sol with predetermined pH and silica content can be formed readily by the use of a hydrogen exchange material. If the solution after passing through the resin is too acid, it is only necessary to add untreated silicate solution to raise the pH to the desired value. And, if the treated solution is too alkaline, it can be passed through more of the resin to lower the pH. The $SiO_2$ content can then be adjusted by evaporation.

Example 4

A solution was prepared by diluting with 23 parts of water 2 parts by weight of "S" silicate of soda, containing about 6.4% by weight $Na_2O$ and having a ratio of 3.9 parts by weight $SiO_2$ to 1 $Na_2O$. The solution had a pH of about 10.9. A silica sol was then formed by adding to this 25 parts of water containing sufficient HCl to reduce the pH to 9.3 (about 0.2 part by weight of 36% HCl solution was required). 50 parts of the resulting 1% $SiO_2$ sol having a pH of 9.3 were combined with 16 parts of "Vultex" formula H-235 a vulcanized latex obtained from General Latex and Chemical Corp., Cambridge, Massachusetts, and containing about 60% rubber solids. The mixture was frozen at about $-20°$ C., thawed and filtered and the solids dried at 50° C. A rubbery mat containing 5% $SiO_2$ formed on drying. This consisted of rubber fibers intertwined about small platelets of $SiO_2$.

Example 5

A silica sol was formed by mixing 25 ml. of "N" silicate of soda diluted to 5% $SiO_2$ by weight with 21 ml. of 0.73 N $H_2SO_4$ and 4 ml. of $H_2O$. This sol had a pH of about 1.7. After dialyzing with a heavy cellophane membrane for about one month the sol had a pH of about 4.9 and contained about 1.2% $SiO_2$. After standing for about eight months the pH was 5.6. A strip of cotton muslin 1″ x 10″ long and a hank of absorbent cotton were dipped into this silica sol. The so-impregnated materials were frozen and after thawing and drying at 60° C. they were compared with similar samples of cotton and muslin frozen in water under the same conditions. The blank or control of muslin had a tensile strength of 40 pounds and an ash weight of 0.05% whereas the treated muslin had a tensile strength of 48 pounds and an ash weight of 0.64%. The hank of treated cotton had small particles of $SiO_2$ with dimensions of about 3–5 microns absorbed on the surface and in the fibers.

Example 6

Duplicate strips of woolen paper machine felt were frozen. One in the dialyzed sol of Example 5 and one in water. These strips were 1″ x 8″ long. The treated wool had a tensile strength of 37 pounds compared to 32 pounds for the blank.

Example 7

A solution containing about 5% $SiO_2$ at a pH of about 11.4 was prepared by dissolving 11 parts of $Na_2SiO_3 \cdot 5H_2O$ in 20 parts of water and mixing with 32 parts of a solution containing about 3.8 parts of HCl. To the resulting silica sol was added 3 parts of asbestos fibers. The mixture was frozen, thawed, and filtered and dried at 50° C. The needle-like fibers of asbestos were intermingled with $SiO_2$ particles about 1 micron in diameter.

Although many surfaces are negatively charged when immersed in water there is little difficulty in attaching particles of $SiO_2$ which are negatively charged in a colloidal sol. For various purposes such as softening, increasing flex resistance, decreasing dusting etc. one may wish to add modifying substances. For instance fatty acids or their soaps such as tallol and stearic acid or coumarin indene resin may be added when forming mixtures of textiles, rubber etc. or cationic surface active agents such as lauryl pyridinium chloride, dibenzyl dimethyl ammonium hydroxide and plasticizers such as triethylene glycol, di-2-ethyl butyrate, glycerol, sugar, sorbitol, algin, protein, locust bean gum, dibutylphthalate or diphenyl ortho chlor phenyl phosphate. Another surface active agent which is useful is "Amine 0" sold by Alrose Chemical Company of Providence R. I. This is a 100% high molecular weight cationic surface active amine having a neutralization equivalent of 385, a specific gravity of 0.95, a refractive index at 34° C. of 1.480 and a boiling point at 2 mm. Hg of 250–280° C.

*Example 8*

In a series of comparative experiments three test samples of asbestos sheet were made. The first was made by mixing in a container 3 parts of asbestos fibers with 47 parts of water, freezing by immersing the container for 30 minutes in a bath of kerosene at −20° C., thawing and then making a sheet by pouring the melt on a filter paper supported on a Buchner funnel. The second sheet was prepared by mixing 3 parts of the same asbestos fibers with 47 parts of the silica sol employed in Example 7, freezing in the same manner, thawing and making a sheet in the same manner. The third sheet was prepared by first soaking 3 parts of the same asbestos fibers in an emulsion consisting of 1 part of semi-refined tallol, sold as "Unitol" by the United Bag and Paper Corporation, in 7 parts of water. The fibers were filtered from the emulsion and mixed with 47 parts of the silica sol used in Example 7, frozen in the same kerosene bath, thawed and formed into a sheet in the same fashion. In comparing the three asbestos sheets made in the manners described it was noted that both sheets which were frozen in admixture with the silica sol were substantially stronger than the sheet formed from the fibers which were merely frozen in water. The sheet which had been treated with tallol was more flexible than the other two sheets, as well as being softer to the touch. Microscopic examination of the sheets revealed numerous particles of silica embedded in and attached to the fibers of those sheets the fibers of which had been frozen in admixture with the silica sol. These silica particles produced the noted increase in strength.

Silica impregnated asbestos sheets very similar in properties to those produced as described above can be obtained by a procedure in which the asbestos fibers are formed into a sheet before being impregnated with a silica sol and then frozen. This can be accomplished, for example, in a continuous process in which a sheet-forming drum is rotated in a suspension of asbestos fibers in a silica sol, the resulting sheet is passed over a refrigerated drum to freeze the sol and then over thawing and drying drums. Various condensed systems involving these steps will immediately suggest themselves to those skilled in the art. This is a practical way of increasing the strength of asbestos sheeting without impairment of its fire resistance etc.

*Example 9*

A sol was formed by mixing 24 parts by weight of a sodium silicate solution containing about 10% $SiO_2$ and 3.1% $Na_2O$ with 25 parts by weight of a solution containing 3.6% HCl. To 50 parts of this 5% $SiO_2$ sol having a pH of about 2 there was added 3.75 parts of powdered cellulose acetate and 10 parts of water. This mixture was frozen and the powder dried at 50° C. This product was a mixture of agglomerates of cellulose acetate and 25% of $SiO_2$ particles attached to the surface of the plastic throughout the mass. This example illustrates a convenient method of filling or extending plastics of all types. It is only necessary to mix a plastic powder with a silica sol, to freeze, thaw and then recover the impregnated plastic still in powder form. As indicated previously this procedure simultaneously produces silica in extremely finely-divided form and mixes it with the plastic to form a filled, non-segregating plastic powder.

*Example 10*

Twenty-five parts of a kaolin clay knowns as Barden clay and sold by J. M. Huber Co. of New York city was dispersed in 200 parts of water and combined with 500 parts of a silica sol containing 15% $SiO_2$ prepared as in Example 3. The mixture was frozen, thawed, separated and dried at 50° C. The product was an intimate, non-segregating mixture of 25% clay and 75% $SiO_2$. This example illustrates how our method can be used in extending and filling inert powders of all types to produce non-segregating mixtures containing finely-divided silica as an extender.

*Example 11*

7.5 parts of ultramarine blue pigment was dispersed in water and mixed with 50 parts of an approximately 5% $SiO_2$ sol prepared by passing "N" silicate of soda diluted eight fold through a bed of an organic exchange resin operating in the hydrogen cycle. The sol had a pH of about 10.5. The mixture was frozen by placing it in a bottle and immersing the latter for 30 minutes in a bath of kerosene chilled to a temperature of about −20 to −31° C. by adding dry ice. Congelation took about 16 minutes. The frozen mass was thawed and the separated solids dried. The product was an intimate, non-segregating mixture of 75% ultra-marine particles and $SiO_2$ platelets.

*Example 12*

Strips of rayon, Belgian linen, pure wool and nylon all 1″ x 8″ in length were immersed in a silica sol containing 7.2% $SiO_2$ at a pH of 9.4 prepared by passin "N" silicate of soda diluted six fold through a bed of resin exchange compound operating in the hydrogen cycle. The mixtures were frozen for 30 minutes at −20° C. On thawing the strips were washed and dried for 24 hours at 50° C. For comparison purposes 4 similar strips of rayon, linen, wool and nylon were treated in the identical manner save for the fact that these strips were frozen in distilled water instead of in a silica sol. The tensile strengths of all the strips were then determined on a Thwing-Albert electro-hydraulic tensile tester. The $SiO_2$ deposited on the first four test strips was flaky and soft.

The results obtained are as follows:

| Fiber | Treated | Untreated |
|---|---|---|
| | Pounds | Pounds |
| Rayon | 45 | 40 |
| Linen | 48 | 45 |
| Nylon | 10 | 8 |
| Wool | 42 | 37 |

The test strips of nylon were cut in half for testing purposes because of their great elasticity.

*Example 13*

Five parts of Congo rubin pigment were dispersed in water and mixed with a sol containing 5% $SiO_2$ at a pH of about 4.5. The sol was prepared as in Example 11 except that ion exchange was stopped when a pH of 4.5 was reached. The mixture was frozen and thawed and the solids separated and dried as usual. The product was an intimate mixture of the pigment and silica particles.

*Example 14*

In operating our invention discrete particles of various materials can be added to the silica sols, such as clay, carbon, etc. or they may be formed in the sol as for instance by the addition of a metal compound to a sol containing an ion with which said metal compound forms an insoluble precipitate. The precipitate formed will depend on the relative solubility of the various possible compounds which might be formed from the ions present.

As a specific example of a process in which the particles to be impregnated with $SiO_2$ are formed in situ, a silicate solution containing 2% $SiO_2$ was modified to a pH of 4.5 by the addition of $H_2SO_4$. A solution of barium chloride containing barium ion equivalent to the sulfate present in the sol was added. While the resulting fine precipitate was dispersed throughout the sol the mixture was frozen. The solid phase recovered after thawing was a mixture of barium sulfate and silica with most of the silica attached to the surface of the barium sulfate crystals. This product forms an excellent pigment.

*Example 15*

Concentrated HCl was added to 10 parts by volume of a 1% solution of $CaCl_2$ until a pH of 0.6 was reached. This solution was mixed with 25 parts of "N" silicate of soda which had been diluted 16 fold, containing about 2.5% $SiO_2$ and cooled to about 4° C. A clear sol at a pH of 9.85 was obtained which upon standing would gel in 15 minutes at 3° C. This sol was mixed with 28 parts of the GR–S latex described in Example 1, frozen immediately, then thawed and the product washed. It was an intimate mixture of rubber, silica and calcium silicate.

It is also possible to add an acid to a silicate solution to form a silicate sol and this sol can then be mixed with calcium chloride solutions or with a solution of a salt of another metal forming an insoluble oxide. Such mixtures can then be mixed with inert materials and frozen to form intimate mixtures of the metallic silicate and the inert material.

*Example 16*

The particles of inert material to be impregnated with $SiO_2$ can be extremely fine, in fact, if desired they can be of colloidal dimensions. As an example of this a 1N solution of $NH_4OH$ was added gradually to a 1/3 $MFeCl_3$ solution until the pH had increased from an original value of 1.43 up to 1.6. The resulting sol was added to "N" silicate of soda diluted 16 fold in the proportions of 10 ml. sol to 30 ml. of the diluted silicate solution. This formed what might be called a mixed $SiO_2$—$Fe(OH)_3$ sol which was frozen and then thawed. This resulted in a non-segregating finely-divided pigment containing iron oxide or hydroxide and $SiO_2$.

*Example 17*

A commercial "N" sodium silicate solution was diluted 16 fold and then passed through a bed of Amberlite IR–100H which had been regenerated with HCl. The so modified solution was mixed with an equal volume of the unmodified dilute "N" which raised the pH from 2.95 to 10.4. Its concentration was about 2.4% $SiO_2$. To 94 parts of this modified solution 0.4 part of crystal violet in 94 parts of water was added. The resulting solution was frozen completely within two minutes after reaching 0° C. and held at —10° C. and upon thawing a highly colored $SiO_2$ precipitate was recovered from the mother liquor. This product was fluffy and showed an excellent color retention when suspended in water. Methylene blue was found to be similarly retained by an $SiO_2$ product obtained by the freezing of an acid modified silicate solution having a pH of 7.8. But it was found that products obtained from silicate sols having acid pH values, although removing such basic dyes from solution, did not exhibit the retention power of products obtained from alkaline silicate solutions.

*Example 18*

An "N" silicate of soda solution was diluted 16 fold to give a solution containing about 2.5% $SiO_2$. This was added to a 0.2 $MFeCl_3$ solution having a pH of 1.5 to form a mixture with a pH of 8.8. Intimately mixed readily filterable metal oxides separated on freezing the mixture at —10° C. for fifteen minutes and thawing. No precipitation occurred during the mixing of the two solutions.

The mixed $Fe_2O_3$—$SiO_2$ product obtained as described above had properties very similar to those of our $SiO_2$ product.

The same diluted "N" was modified with a solution formed by adding $SnCl_4.5H_2O$ to water in an amount equal to that required to produce a 5 per cent solution based on the formula. The mixture was frozen and thawed. When the system had a pH of less than 3, no separation occurred but solutions at pH's of 6, 8.9 and 10.7 showed complete or nearly complete separation of the intimately mixed oxides as judged by the optical density. These solutions were readily mixed but would gel in about a half hour or more.

Systems containing a few per cent of $Ti(SO_4)_2$ and/or $TiOSO_4$, prepared from the reaction of $TiCl_4$ with $H_2SO_4$, as well as those made by the addition of $TiCl_4$ to water in such an amount that the solution contained about four per cent titanium calculated as $TiCl_4$ were mixed with the same diluted "N," without precipitation, to form solutions with pH values between 3 and 9. When frozen and thawed, separation of the mutually intermixed oxides occurred. The refractive indices varied from 1.55 to 1.57. When appropriately heat-treated these have great value as paint pigments.

Basic substances other than alkali silicates cause precipitation of hydrous oxides of tin and titanium from solutions of salts thereof at pH's below those at which irreversible freezing occurs. For titanium the range of precipitation is about 1.5–2.0. However, such basic substances may be used to raise the pH close to the range of precipitation and then the silicate added to bring the system into the pH range at which irreversible freezing will occur. Depending on the amount of silicate used the ratio of $TiO_2$ to $SiO_2$ in the final product will vary.

$TiCl_4$ was added to 50% $H_2SO_4$ and evaporated to expel the hydrogen chloride. A portion of this solution was added to water in an amount necessary to form a solution containing 2 to 4 per cent titanium based on $Ti(SO_4)_2$. The solution was neutralized to a pH of 1.5 by NaOH and then modified to pH values of 3.55 to 7.7 with the silicate solution. Separation of the mutually intermixed oxides occurred on freezing and thawing. Thus the ratio of $TiO_2$ to $SiO_2$ in the final product can be regulated readily.

Other metal oxide-$SiO_2$ products can be produced in the same manner from any metal whose oxide is insoluble and whose salts are prone to extensive acid hydrolysis. In general the concentration of $SiO_2$ should be kept in the range of 2 to 20 per cent and the metals should be added in amounts equivalent to the $SiO_2$ or less but considerable leeway exists depending on the ratio desired in the product.

another metal forming an insoluble oxide. Such mixtures can then be frozen before gelation occurs to form our mixed oxide products.

If it is desired to produce a mixed metastable sol from the aqueous solution of any metal salt whose oxide is insoluble and if a precipitate is formed upon adding the metal salt solution directly to the silicate solution it is only necessary to add sufficient strong acid producing a soluble metal salt either to the metal salt solution or to the silicate solution to prevent precipitation whereupon the two solutions can then be mixed. Insoluble oxides are those which are at least as insoluble as $CaO$ and $Ag_2O$. This method is useful in the preparation of paints and water resistant adhesives.

The concentration of $SiO_2$ should be within the range of 1 to 20 per cent by weight and the concentration of metal salts should be equivalent to the $SiO_2$ or less depending to a large extent on the acidity of the hydrolyzed salt solution.

The explanation seems to be that enough colloidal silica must be formed either to act as a protective colloid for the metal hydroxide or silicate when it is formed or to adsorb the metal ion strongly enough to prevent its precipitation.

The following table gives further examples prepared as described above. The acids used corresponded to the anion of the salt listed. The products were satisfactory in each case.

| Salt Solution | Original pH | pH with Conc. Acid | pH with "N" diluted 16 fold | Color of Product | Refractive Index (±.003) |
|---|---|---|---|---|---|
| 5% $ZnCl_2$ | 6.1 | 0.75 | 6.0 | white | 1.447 |
| 1% $CaCl_2$ | 7.3 | 0.65 | 7.1 | do | 1.441 |
| 1% $CaCl_2$ added to 16 fold diluted "N" modified by the addition of HCl | | | 7.7 | do | 1.441 |
| 5% $FeSO_4.7H_2O$ | 3.8 | 1.0 | 9.45 | light yellow | 1.447 |
| 5% $FeCl_3.6H_2O$ | 1.6 | no acid | 9.3 | light brown | 1.450 |
| 5% $CoCl_2.6H_2O$ | 5.0 | 0.5 | 9.75 | purple | 1.432 |
| 5% $CrCl_3.6H_2O$ | 2.8 | 0.55 | 8.0 | green | 1.457 |
| 5% $AlCl_3.6H_2O$ | 3.15 | 0.8 | 9.5 | white | 1.435 |
| 5% $Th(NO_3)_4.12H_2O$ | 2.4 | 1.6 | 9.55 | do | 1.458 |

*Example 19*

Metal oxide-$SiO_2$ products prepared using sodium silicates and metal salts of strong acids which do not form a strongly acid solution on hydrolysis must be protected from separation before freezing by the addition of acid. By this method sols of silica and metal oxides can be formed and frozen before gelation occurs.

Concentrated HCl was added to 10 ml. of a 5% $ZnCl_2$ solution until a pH of 0.65 was obtained. This was mixed with 50 cc. of "N" diluted 16 fold and a clear sol with a pH of 9.1 was formed which would gel in five minutes. When frozen immediately after formation and thawed, the separation of the amorphous, mutually intermixed oxides appeared to be complete.

In another example concentrated HCl was added to 10 ml. of a 1 per cent solution of $CaCl_2$ until a pH of 0.6 was reached. This solution was mixed with 25 ml. of "N" diluted 16 fold and cooled to about 4° C. A clear sol with a pH of 9.85 and which would gel in fifteen minutes at 3° C. was obtained. When frozen immediately and then thawed, separation appeared to be complete and tests showed the presence of Ca in the product.

As an alternative the acid used in the example of the above paragraph can be added to the silicate solution to form a modified silica sol and this sol can then be mixed with the calcium chloride solution or with the solution of the salt of

*Example 20*

To 340 parts of a 5% $ZnCl_2$ concentrated solution, HCl was added until the pH was reduced to 0.65. To this was added 2660 parts of an "N" silicate of soda solution diluted eight fold and additional acid was added to reduce the pH to the range of about 10.5 to 11. This was mixed with 300 parts of a natural latex (35% solids) solution containing 1 part by weight of piperidinium N-pentamethylene dithiocarbamate as an accelerating agent and 1 part of phenyl beta-naphthyl amine as antioxidant and 1 part by weight of emulsified stearic acid. The mixture was frozen, thawed and washed and formed a compounded rubber crumb which was filtered off and dried. The compounded rubber obtained in this way can be milled if desired before vulcanization depending upon the use to which it is put.

Similar procedures can be used in compounding rubbers suitable for use as tire treads and carcasses, rubber heels, etc., as will be understood by those skilled in the art.

*Example 21*

A silica sol was prepared by adding slowly 25 parts of $SiCl_4$ to 150 parts of an ice-water mixture with continuous agitation. 110 parts of 20% NaOH solution was then added slowly to raise the pH to 1.9. The sol formed was filtered through #41 Whatman filter paper. The filtrate contained 0.9% SiO₂. Triplicate 1″ wide strips of 16 pt. slack-sized kraft paper were immersed and held in the sol for one minute and then frozen by dipping in a mixture of kerosene and solid carbon dioxide which was at a temperature below −20° C. Three more strips of paper were treated similarly except that they were dipped in water containing no silica before freezing. The tensile strengths of these samples were then compared with strips of the original untreated paper with the following results:

| Untreated | Silica Treated | Water Treated |
|-----------|---------------|---------------|
| 90 pounds | 96 pounds     | 85 pounds     |

It is apparent that the freezing action in this case tends to weaken the fiber structure but the absorbed silica overcame such a tendency and even increased the strength over that of the original paper.

*Example 22*

A silica sol was prepared by slowly adding 12.5 parts of concentrated HCl solution (36%) to 400 parts of a solution containing 10% of "N" silicate of soda. When gel began to appear the mixture was immediately diluted with an equal weight of water. The gel was filtered off on #41 Whatman filter paper, re-slurried and filtered three times altogether. The washed gel was then boiled for 15 hours with ammoniacal water solution and the mixture was finally filtered through #41 Whatman filter paper to remove all except peptized silica. The resulting sol had a pH of 9.5 and contained 2.0% SiO₂.

5 parts of paper pulp was then agitated with 55 parts of the sol and frozen solid by submerging for ½ hour in a mixture of kerosene and Dry Ice at a temperature below −20° C. The mixture was then allowed to thaw at 70° C. in an oven over night and a paper sheet was formed by filtering off the fibers on a Buchner funnel. Microscopic examination showed the presence of silica adsorbed on the paper fibers. These hand made sheets of paper were too weak to be tested by the tensile machine available but had a strength greater than that of sheets made in similar fashion without the SiO₂ treatment.

*Example 23*

A glass microscope slide was dipped into the silica sol described in the last example and then immersed in the kerosene Dry Ice mixture at below −20° C. to freeze the coating of sol. The slide was then wiped with a cloth and the operation repeated twice. Another slide was first chilled in the kerosene Dry Ice bath, wiped and dipped into the peptized sol. This was repeated three times. Both slides showed smooth, uniform coatings of SiO₂ on their surfaces.

Another silica sol was prepared by mixing 50 parts of a solution containing 6% concentrated HCl with 50 parts of a solution containing 60% of "N" silicate of soda. The resulting sol had a pH of 11.0. When glass slides were treated in this sol in the same way as described in the preceding paragraph heavier coatings were obtained and stronger irridescence appeared. These coatings were also quite resistant to washing with soap and water.

*Example 24*

50 parts of a 1% silica sol prepared as described in Example 4 were combined with 16 parts of a natural latex containing 60% of rubber solids which had been stabilized with 0.056 part of "Aquarex D" (a sodium salt of a sulfate monoester of higher fatty alcohols sold by E. I. du Pont de Nemours Company, Inc.) and the pH was reduced to 5 by the addition of a 36% HCl solution. To this metastable sol was added 20 parts of sodium chlorate dissolved in 31 parts of water. The temperature was held down by the use of a cold water bath and stirred until the evolution of heat ceased. The sol was then quickly frozen as in Example 4 and the product filtered off, washed and neutralized. The resulting product was a white powder with finely divided platelets of SiO₂ attached to the particles of chlorinated rubber.

*Example 25*

2 parts of "S" silicate of soda were diluted with 23 parts of water. To this solution there was added a solution of 20 parts of sodium chlorate in 31 parts of water. To this mixture there was added 16 parts of a 60% natural rubber latex and the pH of the mixture was slowly reduced by adding concentrated HCl until no further chlorine was released and no more heat evolved. The resulting sol was then quickly frozen at a temperature of about −20° C. and after thawing a product was recovered very similar to that obtained in Example 24. In conducting this process care must be exercised to avoid releasing the chlorine gas too rapidly.

It is also possible to produce a filled chlorinated rubber product by chlorinating a filled rubber product produced as described in Example 4, for example. Such filled rubber products can be readily chlorinated by conventional methods. The filled chlorinated rubber products produced as hereindescribed are chlorinated with extreme uniformity.

*Example 26*

15 parts of a solution containing 60% vulcanized natural latex were mixed with 15 parts of the alkaline sol having a pH of 11 described in the last example. This mixture was submerged for ½ hour in the kerosene Dry Ice bath at below −20° C. It was then thawed over night at 70° C. The spongy solid produced was stirred and washed with fresh water. 10 parts of this curd were then soaked in 140 parts of benzene and after strong agitation a uniform mixture was produced. This was used to adhere strips of kraft paper and a bond was formed having a shear strength of 10 pounds when a lap joint 2″ wide and 1″ long was used. This is an excellent way to form rubber adhesives containing finely divided silica as a filler.

*Example 27*

A mixture containing 14% SiO₂ and 9% sodium oleyl sulfate was prepared by mixing "N" silicate of soda with sodium oleyl sulfuric acid. This mixture was frozen at −20° C. and after thawing the dispersion was treated with alcohol and cooled to precipitate sodium sulfate. When spread on a glass surface, dried and wiped off, the mixture was found to act as an antimisting compound. It is also possible to form an antimisting composition by separating the solids after freezing and thawing and then suspending them in alcohol in such concentration as to form about 27% SiO$_2$ and 18% sodium oleyl sulfate by weight.

The effect in our products of the silica and its colloidal reaction products is to act as a binder to prevent slippage of fibers, to increase resistance to abrasion and tear, to increase the tensile strength, to load and fill, to pigment etc. It is obvious that it will not have all these advantages in every case. For instance in some rubber uses a white and/or inert filler may be desired or a silica-rubber coating for glass fibers, or in others increased strength or electrical resistance properties. Textile fibers may be given increased resistance to slippage, asbestos fibers may be formed into a heat resistant sheet, the wet strength of paper may be increased, detergent mixtures of soap containing silica as a fine abrasive may be prepared, plastics of suitable refractive index may be formed by filling and they may be molded to form clear products such as coatings for table cloths or, with sufficiently different indices of refraction, an opaque marble-like appearance can be imparted. Special properties may be given to clays for pottery use. Colloidal organic materials such as algin, rosin and lignin may be filled or otherwise enhanced in properties. Proteins also may be treated and subsequently polymerized by the use of acid or alkali baths as required. Pigments such as Congo rubin, ultramarine and TiO$_2$ may be treated to extend or otherwise increase their value. Glass surfaces such as those of optical lenses and iconoscopes may be treated to change the optical and surface properties e. g. surface reflection.

A rubber having incorporated therein an inert filler has been sought for many pharmaceutical uses. The destruction of certain complex organic compounds is catalyzed by conventional reactive fillers such as calcium silicate or magnesium oxide etc., but not by our SiO$_2$ filler. Our products may also be employed in the thermal and electrical insulation fields since the new form of silica has the best insulating value of any silica now available. Coatings produced with paints or varnishes which have been filled or extended with this silica are flatter and have greatly increased resistance to marring and chemical attack. Our process can also be used in forming plastic mixtures since the silica in some cases stabilizes the polymer. In the optical industry the process described is excellent for forming phosphor mixtures where pure silica of very fine subdivision is required. Fine absorbent and cosmetic powder preparations may be formed. Other cosmetic compositions are also indicated. Basic mixtures of pigment and filler extenders for paints, inks, enamels, lakes, lubricants, linoleum, rubber, plastics, cleaning and polishing powders may be prepared by the use of our process. Also catalysts, insecticides, fungicides, bactericides etc. may be formed. Refractory compositions and magnesia ceramics are instances of other fields of usefulness.

It is obvious that very wide use may be made of the techniques and mixed products covered by this invention which in substance results in the formation of extremely intimate non-segregating mixtures of SiO$_2$ and inert solid materials without ordinary milling or other grinding techniques of the prior art. These mixtures are composed of silica or siliceous reaction products thereof deposited upon the surfaces of or otherwise intimately mixed with inert materials which may be clays, pigments, fibers, or colloidal systems etc. Other modifications of our invention which fall within the scope of the following claims will be immediately evident to those skilled in this art.

What we claim is:

1. In the manufacture of non-segregating, silica-impregnated and coated materials, the process which comprises forming a liquid dispersion of a finely-divided inert material to be impregnated in a liquid aqueous silica sol which is subject to irreversible freezing, subjecting the said dispersion to freezing temperatures under conditions producing complete freezing within less than one hour and before any substantial gel formation takes place, thawing the frozen mass and recovering the resulting silica-impregnated material therefrom.

2. The process of claim 1 wherein said finely-divided inert material is formed in situ by chemical reaction in said silica sol.

3. The process of claim 1 wherein said finely-divided inert material is admixed with a pre-formed silica sol to produce said dispersion.

4. The process of claim 1 wherein said dispersion is formed by mixing a first aqueous solution comprising an alkali metal silicate with a second aqueous solution containing at least one chemical capable of reacting with chemicals present in said first solution to produce a liquid silica sol and simultaneously to produce a finely-divided inert material dispersed therein.

5. The process of claim 1 wherein said silica sol contains from about 5 parts per million to 30 per cent by weight of SiO$_2$.

6. The process of claim 1 wherein said silica sol has a pH within the range of about 4.5 to 11.4 and a concentration of SiO$_2$ ranging from about 2 to 25 per cent by weight.

7. The process of claim 1 wherein the silica sol is frozen completely within a period of less than 10 minutes.

8. The process of claim 1 wherein the silica sol is formed from a commercial solution of alkali metal silicate by altering the pH thereof to within the range of 1 to 12.5 and to produce a weight ratio of SiO$_2$ to alkali metal oxide available to combine therewith of at least about 5 to 1.

9. The process of claim 1 wherein said finely-divided inert material is a fibrous material.

10. The process of claim 1 wherein said finely-divided inert material is an organic polymeric material.

11. The process of claim 1 wherein said finely-divided inert material comprises the particles of a rubber latex.

12. In the manufacture of a rubber filled with SiO$_2$, the process which comprises forming a liquid mixture of a rubber latex with a liquid aqueous silica sol subject to irreversible freezing and containing from about 2 to 25 per cent of SiO$_2$ by weight, freezing the liquid mixture rapidly, within less than one hour and before any substantial gelation occurs thawing and recovering the resulting rubber crumb filled with finely-divided SiO$_2$.

13. In the production of an SiO$_2$-filled rubber, the process which comprises mixing an aqueous solution of sodium silicate with a rubber latex and adjusting the pH to form a liquid silica sol from the sodium silicate present, rapidly freezing the liquid mixture within less than one hour and before any substantial gelation takes place, thawing and recovering the resulting rubber crumb filled with finely-divided amorphous particles of $SiO_2$.

14. In the production of non-segregating, silica-impregnated and coated materials, the process which comprises reducing the pH of a commercial aqueous sodium silicate solution to within the range of about 4.5 to 11.5 to produce a liquid silica sol, suspending in said silica sol finely-divided particles of an inert material to be impregnated, freezing the resulting liquid suspension within a period of less than 10 minutes and before any substantial gelation occurs, thawing and recovering from the melt the resulting inert particles containing finely-divided particles of $SiO_2$ deposited thereon and cemented thereto.

15. In the manufacture of precipitated metal oxides, the process which comprises mixing an aqueous solution of an alkali metal silicate solution having a concentration within the range of about 2 to 20 per cent $SiO_2$ by weight with an aqueous solution of a salt of a metal forming an insoluble oxide, a sufficient quantity of acid being included in the mixture to produce a pH within the range of about 4.5 to 10, completely freezing the resulting liquid mixture within a time period of from a small fraction of a second to not substantially over an hour and before any substantial gelation takes place, thawing and recovering the resulting precipitated oxide product.

16. In the manufacture of non-segregating $SiO_2$-impregnated and coated materials, the process which comprises adding an acid material to a commercial aqueous solution of sodium silicate until the weight ratio of $SiO_2$ to $Na_2O$ available to combine therewith is greater than 5 : 1, mixing in a finely-divided inert material to be impregnated, subjecting the resulting liquid mixture to freezing temperatures under conditions producing rapid congelation, within less than one hour and before any substantial gelation takes place thawing and recovering the resulting $SiO_2$-impregnated material.

17. As a new composition of matter, a finely-divided, non-segregating inert material the particles of which have deposited thereon and cemented thereto finely-divided particles of amorphous $SiO_2$ the bulk of which appear under the petrographic microscope to be in the form of thin soft transparent laminated flakes which are sometimes rectangular in shape, having clearly defined, straight, tapering edges and varying in size from about 1 to 15 microns in maximum dimension; the said composition being produced by rapidly freezing an aqueous liquid mixture of the finely-divided inert material with a liquid silica sol which is subject to irreversible freezing, freezing taking place within less than one hour and before any substantial gelation occurs, thawing and recovering the resulting finely-divided product.

18. As a new composition of matter, finely-divided particles of an insoluble metal oxide the particles of which have deposited thereon and cemented thereto finely-divided particles of amorphous $SiO_2$ the bulk of said $SiO_2$ particles appearing under the petrographic microscope to be in the form of thin soft transparent laminated flakes which are sometimes of rectangular shape having clearly defined, straight, tapering edges and varying in size from about 1 to 15 microns in maximum dimension, said flakes under the electron microscope appearing as aggregates of particles having dimensions of from about 10 to 30 Angstrom units, said flakes being soft and readily broken into smaller particles with clearly defined edges; the said composition being produced by rapidly freezing a liquid mixture of the finely-divided insoluble metal oxide and a liquid silica sol which is subject to irreversible freezing, freezing taking place within less than one hour and before any substantial gelation occurs, thawing and recovering the resulting finely-divided product.

19. As a new composition of matter, a rubber containing uniformly dispersed therethrough finely-divided particles of amorphous $SiO_2$ the bulk of which under the petrographic microscope appear to be in the form of thin soft transparent laminated flakes which are sometimes of rectangular shape having clearly defined, straight, tapering edges varying in size from about 1 to 15 microns in maximum dimension, said flakes under the electron microscope appearing as aggregates of particles having dimensions of from about 10 to 30 Angstrom units, said flakes having a refractive index of about 1.43 to 1.47 and being soft and free from sharp edges and rough surfaces; the said composition being produced by rapidly freezing a liquid mixture of a rubber latex and a liquid silica sol which is subject to irreversible freezing, freezing taking place within less than one hour and before any substantial gelation occurs, thawing and recovering the resulting rubber crumb.

20. As a new composition of matter, a chlorinated rubber containing uniformly dispersed therethrough finely-divided particles of amorphous $SiO_2$ the bulk of which under the petrographic microscope appear to be in the form of thin soft transparent laminated flakes which are sometimes of rectangular shape having clearly defined, straight, tapering edges varying in size from about 1 to 15 microns in maximum dimension, said flakes under the electron microscope appearing as aggregates of particles having dimensions of from about 10 to 30 Angstrom units, said flakes having a refractive index of about 1.43 to 1.47 and being soft and free from sharp edges and rough surfaces; the said composition being produced by rapidly freezing a liquid mixture of the finely-divided rubber chloride and a liquid silica sol which is subject to irreversible freezing, freezing taking place within less than one hour and before any substantial gelation occurs, thawing and recovering the resulting composition.

21. In the coating and impregnating of the surfaces of solid materials with silica, the process which comprises contacting the surface to be coated and impregnated with a liquid aqueous silica sol which is subject to irreversible freezing, subjecting the silica sol while in contact with said surface to freezing temperatures under conditions producing complete freezing within less than one hour and before gel formation takes place, thawing the frozen mass and removing water from the resulting coating.

22. In the formation of irridescent surface coatings on glass articles, the process which comprises contacting a glass surface to be coated with a liquid aqueous silica sol which is subject to irreversible freezing, subjecting the silica sol while in contact with said surface to freezing temperatures under conditions producing complete freezing within less than one hour and before gel formation takes place, thawing the frozen mass and removing water from the resulting coating.

JOHN HAINES WILLS.
JAMES FREDERIC HAZEL.

References Cited in the file of this patent

UNITED STATES PATENTS

| Number | Name | Date |
|---|---|---|
| 1,993,290 | Twiss et al. | Mar. 5, 1935 |
| 2,006,770 | Jones | July 2, 1935 |
| 2,040,818 | Badollet | May 19, 1936 |
| 2,074,938 | Reed | Mar. 23, 1937 |
| 2,278,746 | Sturgeon | Apr. 7, 1942 |
| 2,302,833 | Behrman | Nov. 24, 1942 |
| 2,309,005 | Ogilby | Jan. 19, 1943 |
| 2,345,191 | Gage | Mar. 28, 1944 |
| 2,366,516 | Geffcken et al. | Jan. 2, 1945 |
| 2,428,178 | Reik et al. | Sept. 30, 1947 |
| 2,429,439 | Westfahl et al. | Oct. 21, 1947 |
| 2,432,353 | Talalay | Dec. 9, 1947 |
| 2,561,304 | Hazel | July 17, 1951 |